(12) United States Patent
Shaffer et al.

(10) Patent No.: US 7,639,634 B2
(45) Date of Patent: Dec. 29, 2009

(54) METHOD AND SYSTEM FOR JOINING A VIRTUAL TALK GROUP

(75) Inventors: Shmuel Shaffer, Palo Alto, CA (US); Shah Talukder, Los Gatos, CA (US); Kittur V. Nagesh, Saratoga, CA (US); Douglas J. Hall, Westerville, OH (US)

(73) Assignee: Cisco Technology, Inc., San Jose, CA (US)

( * ) Notice: Subject to any disclaimer, the term of this patent is extended or adjusted under 35 U.S.C. 154(b) by 385 days.

(21) Appl. No.: 11/421,994

(22) Filed: Jun. 2, 2006

(65) Prior Publication Data

US 2007/0280195 A1 Dec. 6, 2007

(51) Int. Cl.
*H04B 1/38* (2006.01)
*H04B 7/00* (2006.01)
*H04M 3/42* (2006.01)
*H04M 3/00* (2006.01)
*H04L 12/16* (2006.01)

(52) U.S. Cl. .............. 370/266; 370/261; 370/270; 370/271; 455/90.2; 455/416; 455/420; 455/519

(58) Field of Classification Search .............. 455/519, 455/412.1, 419, 90.2, 416, 420; 370/261, 370/266, 270, 271
See application file for complete search history.

(56) References Cited

U.S. PATENT DOCUMENTS

| | | | |
|---|---|---|---|
| 4,359,603 A | 11/1982 | Heaton | 370/267 |
| 4,730,306 A | 3/1988 | Uchida | 370/263 |
| 5,048,082 A | 9/1991 | Krafft et al. | 379/406.07 |
| 5,099,510 A | 3/1992 | Blinken et al. | 379/202.01 |
| 5,436,896 A | 7/1995 | Anderson et al. | 370/260 |
| 5,539,741 A | 7/1996 | Barraclough et al. | 370/267 |
| 5,625,407 A | 4/1997 | Biggs et al. | 348/14.11 |
| 6,005,848 A * | 12/1999 | Grube et al. | 370/266 |
| 6,011,851 A | 1/2000 | O'Connor et al. | 381/17 |
| 6,094,578 A | 7/2000 | Purcell et al. | 455/426 |
| 6,178,237 B1 | 1/2001 | Horn | 379/202.01 |
| 6,185,205 B1 | 2/2001 | Sharrit et al. | 370/389 |
| 6,233,315 B1 | 5/2001 | Reformato et al. | 379/88.01 |
| 6,327,567 B1 | 12/2001 | Willehadson et al. | 704/270 |
| 6,374,100 B1 | 4/2002 | Smith et al. | 455/419 |
| 6,385,461 B1 * | 5/2002 | Raith | 455/518 |
| 6,400,816 B1 | 6/2002 | Hjalmtysson et al. | 379/201.03 |
| 6,404,873 B1 | 6/2002 | Beyda et al. | 379/202.01 |
| 6,408,327 B1 | 6/2002 | McClennon et al. | 709/204 |

(Continued)

FOREIGN PATENT DOCUMENTS

WO    WO 01/91485    11/2001

(Continued)

OTHER PUBLICATIONS

NetworkFirst Interoperability Solved, Data Sheet, M/A-COM, Inc., ECR-7018A, http://www.networkfirst.com/resources/pdf/NetworkFirstRevised5₁₃ 03.pdf, 6 pages.

(Continued)

*Primary Examiner*—Fan Tsang
*Assistant Examiner*—Lisa Hashem
(74) *Attorney, Agent, or Firm*—Baker Botts L.L.P.

(57) ABSTRACT

A method for joining a virtual talk group includes facilitating communications of a virtual talk group. The virtual talk group includes a plurality of endpoints of different communication networks. The method also includes recording the communications of the plurality of endpoints of the virtual talk group. The method also includes adding a first endpoint to the virtual talk group and presenting the first endpoint with the recorded communications of the plurality of endpoints of the virtual talk group.

29 Claims, 2 Drawing Sheets

| | | | | |
|---|---|---|---|---|
| 6,418,214 | B1 | 7/2002 | Smythe et al. | 379/202.01 |
| 6,453,022 | B1 | 9/2002 | Weinman, Jr. | 379/88.13 |
| 6,501,739 | B1 | 12/2002 | Cohen | 370/260 |
| 6,501,740 | B1* | 12/2002 | Sun et al. | 370/261 |
| 6,608,820 | B1 | 8/2003 | Bradshaw, Jr. | 370/260 |
| 6,792,092 | B1 | 9/2004 | Michalewicz | 379/202 |
| 6,850,496 | B1 | 2/2005 | Knappe et al. | 370/260 |
| 6,873,854 | B2* | 3/2005 | Crockett et al. | 455/518 |
| 6,882,856 | B1 | 4/2005 | Alterman et al. | 455/519 |
| 6,885,874 | B2* | 4/2005 | Grube et al. | 455/520 |
| 6,912,389 | B2 | 6/2005 | Bright et al. | 455/433 |
| 6,944,137 | B1* | 9/2005 | Pan et al. | 370/266 |
| 6,965,767 | B2* | 11/2005 | Maggenti et al. | 455/416 |
| 6,982,961 | B2 | 1/2006 | Refai et al. | 370/265 |
| 6,987,480 | B1 | 1/2006 | Kotick et al. | 342/41 |
| 6,987,841 | B1 | 1/2006 | Byers et al. | 379/88.17 |
| 6,993,120 | B2 | 1/2006 | Brown et al. | 379/88.13 |
| 6,996,406 | B2 | 2/2006 | Lection et al. | 455/457 |
| 6,999,782 | B2 | 2/2006 | Shaughnessy et al. | 455/518 |
| 6,999,783 | B2* | 2/2006 | Toyryla et al. | 455/519 |
| 7,003,286 | B2 | 2/2006 | Brown et al. | 455/416 |
| 7,006,607 | B2 | 2/2006 | Garcia | 379/88.18 |
| 7,010,106 | B2 | 3/2006 | Gritzer et al. | 379/202.01 |
| 7,010,109 | B2 | 3/2006 | Gritzer et al. | 379/202.01 |
| 7,010,275 | B2 | 3/2006 | Davies | 455/90.2 |
| 7,013,279 | B1 | 3/2006 | Nelson | 704/270 |
| 7,031,700 | B1 | 4/2006 | Weaver et al. | 455/420 |
| 7,035,385 | B2 | 4/2006 | Levine et al. | 379/88.23 |
| 7,058,168 | B1 | 6/2006 | Knappe et al. | 379/204.01 |
| 7,062,286 | B2* | 6/2006 | Grivas et al. | 455/518 |
| 7,079,857 | B2 | 7/2006 | Maggenti et al. | 455/518 |
| 7,292,544 | B2* | 11/2007 | Roher et al. | 370/261 |
| 7,426,192 | B2* | 9/2008 | Amano et al. | 370/261 |
| 7,466,812 | B1* | 12/2008 | Mahy et al. | 379/202.01 |
| 7,526,306 | B2* | 4/2009 | Brems et al. | 455/518 |
| 7,558,221 | B2* | 7/2009 | Nelson et al. | 370/260 |
| 2001/0028321 | A1 | 10/2001 | Krasner | 342/357.1 |
| 2002/0013813 | A1 | 1/2002 | Matsuoka | 709/204 |
| 2002/0152305 | A1 | 10/2002 | Jackson et al. | 709/224 |
| 2002/0178364 | A1 | 11/2002 | Weiss | 713/182 |
| 2003/0100326 | A1 | 5/2003 | Grube et al. | 455/515 |
| 2004/0054428 | A1 | 3/2004 | Sheha et al. | 700/56 |
| 2004/0070515 | A1 | 4/2004 | Burkley et al. | 340/825.49 |
| 2004/0139320 | A1 | 7/2004 | Shinohara | 713/168 |
| 2004/0185863 | A1 | 9/2004 | Ogami | 455/452.1 |
| 2004/0192353 | A1 | 9/2004 | Mason et al. | 455/457 |
| 2004/0249949 | A1 | 12/2004 | Gourraud et al. | 707/227 |
| 2005/0015444 | A1* | 1/2005 | Rambo | 709/204 |
| 2005/0053214 | A1* | 3/2005 | Reding et al. | 379/202.01 |
| 2005/0135348 | A1 | 6/2005 | Staack | 370/353 |
| 2005/0174991 | A1 | 8/2005 | Keagy | 370/352 |
| 2005/0232207 | A1 | 10/2005 | Antoniadis et al. | 370/338 |
| 2005/0265256 | A1 | 12/2005 | Delaney | 370/254 |
| 2006/0114847 | A1 | 6/2006 | Dssouli et al. | 370/261 |
| 2006/0118636 | A1 | 6/2006 | Miles et al. | 235/472 |
| 2006/0165060 | A1 | 7/2006 | Dua | 370/352 |
| 2007/0030144 | A1 | 2/2007 | Titus et al. | 340/534 |
| 2007/0060144 | A1 | 3/2007 | Mills et al. | 455/445 |
| 2007/0115848 | A1 | 5/2007 | Chean et al. | 370/252 |
| 2007/0270172 | A1* | 11/2007 | Kalley et al. | 455/518 |
| 2007/0274460 | A1* | 11/2007 | Shaffer et al. | 379/37 |
| 2008/0037461 | A1 | 2/2008 | Biltz et al. | 370/328 |
| 2008/0167049 | A1 | 7/2008 | Karr et al. | 455/456 |

FOREIGN PATENT DOCUMENTS

| | | |
|---|---|---|
| WO | WO 02/074051 | 9/2002 |

OTHER PUBLICATIONS

Network Solution:, Information Sheet, NetworkFirst, M/A-COM, Inc., http://www.networkfirst.com/features/solution, 2 pages.

It's Our Network That Makes The Difference, Information Sheet, OpenSky Network, M/A-COM, Inc., http://www.opensky.com/network/index.asp, 2 pages.

Network Management, Information Sheet, OpenSky Network, M/A-COM, Inc., http://www.opensky.com/network/netmgmtsys.asp, 2 pages.

ACU-1000™ Interoperability NOW™, Information Sheet, Raytheon JPS Communications, http://www.jps.com/downloads/PDFS/acuupgrade.pdf, 4 pages.

Interoperability Gateway, OpenSky, NetworkFirst, P25$^{IP}$, Data Sheet, M/A-COM, Inc. ECR-7054, http://www.opensky.com/network/7054.pdf, 2 pages.

C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages.

V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages.

J. Polk, et al., Dynamic Host Configuration Protocol Option for Coordinate-based Location Configuration Information, Network Working Group, Internet RFC 3825, Category: Standards Track, The Internet Society, 15 pages, Jul. 2004.

OnStar Technology, Information Sheet, OnStar Corp., http://www.onstar.com/us_english/jsp/explore/onstar_basics/technology.jsp, 3 pages, 2005.

Cisco IP Interoperability and Collaboration System, Q&A, Copyright © Cisco Systems, Inc. www.cisco.com, 4 pages.

Cisco IPICS, Solution Overview, Copyright © Cisco Systems, Inc., www.cisco.com/go/ipics, 6 pages.

Matthews, et al., *A New Interoperability Paradigm A Concept Proposal*, Mar. 2006, Worcester Polytechnic Institute, WPI Bioengineering Institute (Mar. 2006), 15 pages.

Shaffer, et al., U.S. Appl. No. 11/149,041, filed Jun. 8, 2005, *Method and System for Communicating Using Position Information*.

Shaffer, et al., U.S. Appl. No. 11/201,832, filed Aug. 10, 2005, *Method and System for Automatic Configuration of Virtual Talk Groups Based on Location of Media Source*.

Shaffer, et al., U.S. Appl. No. 11/202,400, filed Aug. 10, 2005, *Method and System for Communicating Media Based on Location of Media Source*.

Shaffer, et al., U.S. Appl. No. 11/202,403, filed Aug. 10, 2005, *Method and System for Providing Interoperable Communications with Location Information*.

Shaffer, et al., U.S. Appl. No. 11/214,582, filed Aug. 29, 2005, *Method and System for Conveying Source Location Information*.

Shaffer, et al., U.S. Appl. No. 11/364,146, filed Feb. 27, 2006, *Method and System for Providing Interoperable Communication with Congestion Management*.

Shaffer, et al., U.S. Appl. No. 11/365,113, filed Feb. 28, 2006, *Method and System for Providing Interoperable Communication with Dynamic Event Area Allocation*.

Shaffer, et al., U.S. Appl. No. 11/399,031, filed Apr. 5, 2006, *Method and System for Managing Virtual Talk Groups*.

Shaffer, et al., U.S. Appl. No. 11/382,496, filed May 10, 2006, *Providing Multiple Virtual Talk Group Communication Sessions*.

Shaffer, et al., U.S. Appl. No. 11/421,999, filed Jun. 2, 2006, *Method and System for Managing a Plurality of Virtual Talk Groups*.

Kalley, et al., U.S. Appl. No. 11/383,998, filed May 18, 2006, *Providing Virtual Talk Group Communications Sessions in Accordance with Endpoint Resources*.

Shaffer, et al., U.S. Appl. No. 11/617,019, filed Dec. 28, 2006, *Method and System for Providing Congestion Management within a Virtual Talk Group*.

Shaffer, et al., U.S. Appl. No. 11/746,960, filed May 10, 2007, *Method and System for Handling Dynamic Incidents*.

Shaffer, et al., U.S. Appl. No. 11/550,234, filed Oct. 17, 2006, *Method and System for Providing an Indication of a Communication*, Oct. 27, 2006.

PCT Notification of Transmittal of the International Search Report and the Written Opinion of the International Searching Authority, or the Declaration, mailed Feb. 27, 2007, corresponding to PCT/US06/30447 filed Aug. 3, 2006 (20 pages).

PCT Notification of Transmittal of the International Search Report and the Written Opinion of the International Searching Authority, or the Declaration, mailed Apr. 9, 2007, corresponding to PCT/US06/30294 filed Aug. 2, 2006 (20 pages).

NetworkFirst Interoperability Solved, Data Sheet, M/A-COM, Inc., ECR-7018A, http://www.networkfirst.com/resources/pdf/NetworkFirstRevised5_03.pdf, 6 pages, May 2003.

Network Solution:, Information Sheet, NetworkFirst, M/A-COM, Inc., http://www.networkfirst.com/features/solution, 2 pages, 2003.

ACU-1000™ Interoperability NOW™, Information Sheet, Raytheon JPS Communications, http://www.ips.com/downloads/PDFS/acuupgrade.pdf, 4 pages, Mar. 2004.

Interoperability Gateway, OpenSky, NetworkFirst, P25$^{IP}$, Data Sheet, M/A-COM, Inc. ECR-7054, http://www.opensky.com/network/7054.pdf, 2 pages, May 2003.

C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages, Oct. 2003.

V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages, Oct. 2004.

Cisco IP Interoperability and Collaboration System, Q&A, Copyright © Cisco Systems, Inc. www.cisco.com, 4 pages, Oct. 2005.

Cisco IPICS, Solution Overview, Copyright © Cisco Systems, Inc., www.cisco.com/go/ipics, 6 pages, Oct. 2005.

MRT Urgent Communications: Service, Safety, Security, M/A-Com Emphasizes Power of IP in Seven Announcements at APCO, Aug. 18, 2002, 6 pages. http://mrtmag.com/products/new/radio_macom_emphasizes_power, Aug. 18, 2002.

Jim McKay, *Government Technology*, "Intact Amid Chaos", Mar. 2005, 2 pages, Mar. 2005.

Ian Hoffman, *Oakland Tribune*, "Oakland's New Radios Pass Test, City, Regional Agencies Get Green Light to Buy Public-Safety Equipment," 2007, 2 pages (reprinted by Tyco Electronics and available at http://www.macom-wireless.com/news/oaklands%20new%20radios.asp), Mar. 11, 2005.

MRT Urgent Communications: Service, Safety, Security, "5 For '05 Technologies," Dec. 1, 2004, 9 pages. http://mrtmag.com/mag/radio_technologies.

MRT Urgent Communications: Service, Safety, Security, John Facella, "ROIP Success Is in the Details," Dec. 1, 2004, 3 pages. http://mrtmag.com/mag/radio_roip_success_details/.

Ann Imse, *Rocky Mountain News*, "Radio Breakthrough for Cops, Firefighters," Dec. 10, 2004, 2 pgs.

*First Responder Communications*, A Supplement to MRT and Fire Chief, "IP Opens Eyes," Aug. 2004, 5 pages.

*MRT, Mobile Radio Technology*, "IP Evangelist," Apr. 2004, 4 pages, www.iwce-mrt.com.

Ron Bender, et al., *MRT, Mobile Radio Technology* "Multiple Choices for Critical Communications," Oct. 2001, 4 pages, www.mrtmag.com.

Jay Herther, et al., *MRT, Mobile Radio Technology*, "Voice-over-Interintranet Protocol for Critical Communications," Aug. 2001, 4 pages, www.mrtmag.com.

*What's New in Radio Communications*, Aug./Sep. 2001, vol. 14 No. 1, Inside: Marine Radio, 2 pages, www.westwick-farrow.com.au.

PCT International Search Report and Written Opinion (ISA/US) for PCT/US06/19227; 7 pages, Sep. 4, 2007.

Rivero-Angeles, Mario et al., *Random-Access Control Mechanism Using Adaptive Traffic Load in ALOHA and CSMA Strategies for EDGE*, May 2005, IEEE Transactions on Vehicular Technology, Vo. 54, No. 3, 2 (1161) May 2005.

\* cited by examiner

METHOD AND SYSTEM FOR JOINING A VIRTUAL TALK GROUP

TECHNICAL FIELD OF THE INVENTION

This invention relates in general to communication systems and, more particularly, to a method and system for joining a virtual talk group.

BACKGROUND OF THE INVENTION

Many public and private groups, such as security and safety personnel (e.g., police, fire fighters and ambulance drivers) use various different communication devices operating on various different communication networks. For example, many public service organizations, such as police, fire and EMT, utilize land mobile radios communicating through push-to-talk technologies. Each organization may have its own communication network and/or its own communications channel. However, communications among different endpoints of different networks such as endpoints of different police, fire or other security networks may present a challenge. Collaboration between the different agencies and networks tends to be ad hoc and inefficient. When achieved, it often involves laborious manual intervention. Organizations working towards interoperability solutions include Raytheon JPS Communications, IP Blue, Twisted Pair, M/A-COM, Motorola, EADS, and Cisco Systems.

SUMMARY OF THE INVENTION

The present invention provides a method and system for joining a virtual talk group that substantially eliminates or reduces at least some of the disadvantages and problems associated with previous methods and systems.

In accordance with a particular embodiment, a method for joining a virtual talk group includes facilitating communications of a virtual talk group. The virtual talk group includes a plurality of endpoints of different communication networks. The method also includes recording the communications of the plurality of endpoints of the virtual talk group. The method also includes adding a first endpoint to the virtual talk group and presenting the first endpoint with the recorded communications of the plurality of endpoints of the virtual talk group.

In particular embodiments of the present invention the method may also include facilitating communications among the plurality of endpoints of the virtual talk group and the added first endpoint while presenting the first endpoint with the recorded communications. In some embodiments this may include presenting the first endpoint with the recorded communications when there is a pause in the communications of the plurality of endpoints of the virtual talk group.

In particular embodiments facilitating communications among the plurality of endpoints of the virtual talk group and the added first endpoint while presenting the first endpoint with the recorded communications may include pausing the presentation of the recorded communications to the first endpoint upon detecting an endpoint communication. In some embodiments this may include pausing the presentation of the recorded communications to the first endpoint upon detecting an endpoint communication having a priority greater than the recorded communication.

In particular embodiments of the present invention the method may also include providing an indication to the first endpoint. The indication may indicate that the first endpoint is being presented with the recorded communications of the virtual talk group such that the first endpoint may distinguish the recorded communications from the communications of the plurality of endpoints of the virtual talk group. In particular embodiments of the present invention the method may also include receiving a request from the first endpoint to change the manner by which the recorded communications are presented or receiving a request from the first endpoint to control the manner of the presentation of the recorded communications.

Where the method includes presenting the first endpoint with the recorded communications, the method may include increasing the rate by which the recorded communications are presented.

In some embodiments the method may include determining that a condition of a predetermined policy has been satisfied and recording the communications of the plurality of endpoints of the virtual talk group based on the satisfaction of the condition of the predetermined policy. In particular embodiments determining that a condition of a predetermined policy has been satisfied may include detecting the absence of the first endpoint from the virtual talk group.

In particular embodiments of the present invention the method may also include determining that the first endpoint is not present in the virtual talk group. The method may also include recording the communications of the plurality of endpoints of the virtual talk group based on the first endpoint not being present in the virtual talk group.

In accordance with another embodiment, a system for joining a virtual talk group includes a processor operable to facilitate communications of a virtual talk group. The virtual talk group includes a plurality of endpoints of different communication networks. The processor is further operable to record the communications of the plurality of endpoints of the virtual talk group. The processor is also operable to add a first endpoint to the virtual talk group. The system also includes an interface coupled to the processor and operable to present the first endpoint with the recorded communications of the plurality of endpoints of the virtual talk group.

Technical advantages of particular embodiments include systems and methods for providing an automated way of apprising users of endpoints that join a virtual talk group of the current situation within the virtual talk group. Accordingly, users of other endpoints within the virtual talk group may remain focused on their task, instead of diverting their attention to update the recently added endpoint. Particular embodiments may allow a user of the recently added endpoint to control the presentation of the previously recorded communications. Accordingly, the user may receive the information he wants, when and how he wants it. Particular embodiments allow for the information to be presented when there are no other communications within the virtual talk group. Accordingly, a user of an added endpoint may receive the recorded communications without missing current communications. In some embodiments the recorded communications may be presented to the endpoint such that they may be distinguished from the virtual talk group's communications. Thus, the user of the endpoint receiving both the recorded communications and the virtual talk group communications is able to distinguish between them.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Figure 1:
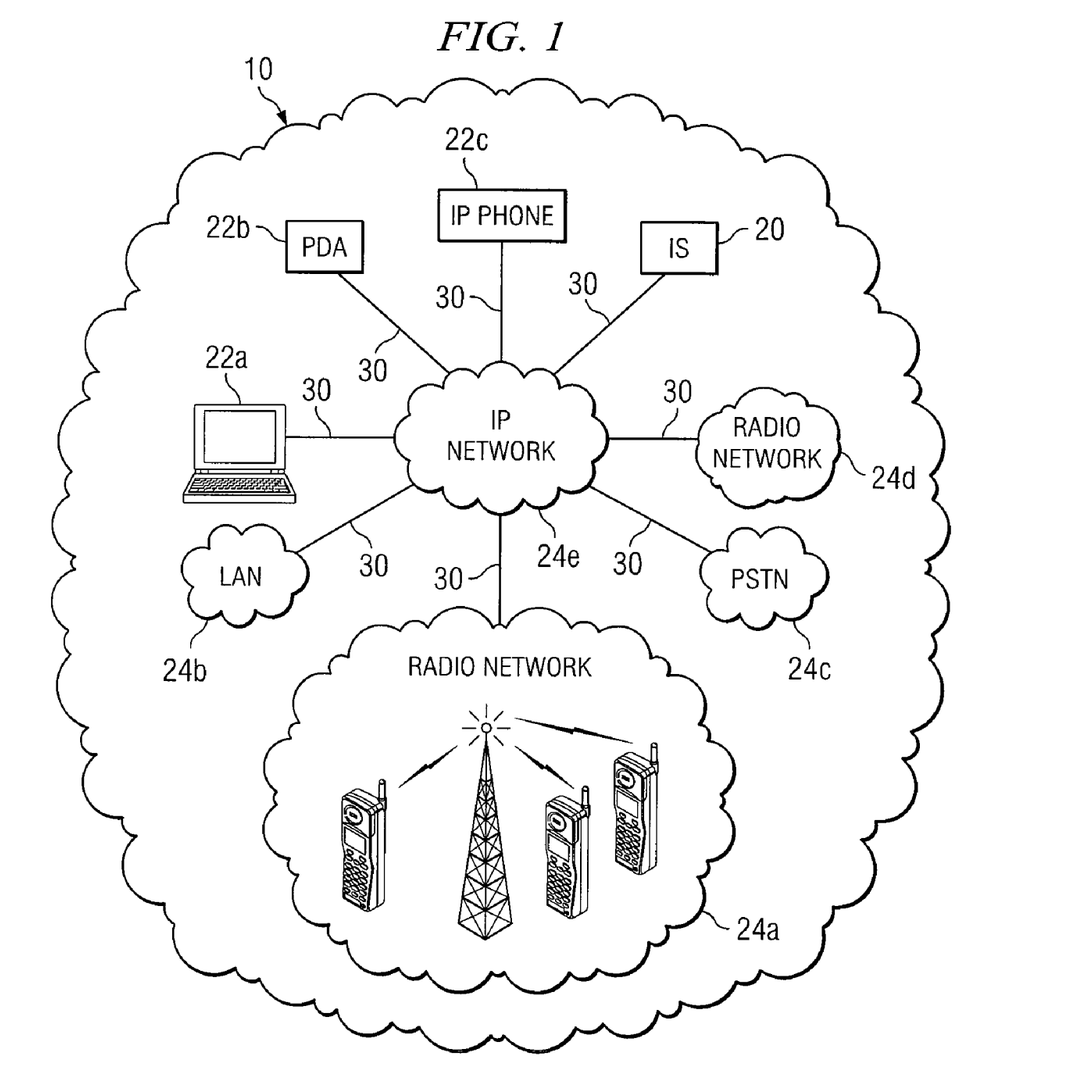
FIG. 1 illustrates a communication system with various communication networks and an interoperability system, in accordance with a particular embodiment.

FIG. 1 illustrates a communication system 10, in accordance with a particular embodiment. Communication system 10 includes communication networks 24a-24e, interoperability system (IS) 20 and endpoints 22a-22c. IS 20 is able to facilitate interoperable communication sessions between and among various communication devices, such as endpoints of communication networks 24 and endpoints 22. IS 20 uses a systems approach to offer a framework based on IP protocols and services to achieve secure voice, video and other data interoperability among communication endpoints and networks utilizing different technologies.

In particular embodiments, a virtual talk group (VTG) may be formed to allow endpoints from different communication networks to communicate with one another as though they were part of the same communication network. Often a VTG may be formed in response to a particular situation. The situation may be dynamic, for example a VTG formed in response to an event; or it may be static, for example a VTG formed based on a particular location. Regardless of how the VTG is formed, during the life of the VTG the endpoints that make up the VTG may change. When an endpoint joins the VTG that endpoint may not fully understand or know the situation within the VTG. To update the new endpoint, particular embodiments may play back previously recorded communications from endpoints within the VTG. These communications may have been recorded and subsequently played back via IS 20.

In the illustrated embodiment, communication networks 24a and 24d comprise radio networks (RNs), communication network 24b comprises a local area network (LAN), communication network 24c comprises a PSTN and communication network 24e comprises an IP network. It should be understood, however, that communication system 10 may comprise any number of IP or non-IP communication networks of any wireless or wireline form capable of communicating audio and/or video telecommunication signals, data, and/or messages, including signals, data or messages. Communication networks 24a-24e may include any number and combination of segments, nodes and endpoints to enable communication among network devices and components. Communication networks 24a-24e may be distributed locally or across multiple cities and geographic regions. Nodes may include any combination of network components, gatekeepers, call managers, conference bridges, routers, hubs, switches, gateways, base stations, endpoints or other hardware, software or embedded logic implementing any number of communication protocols that allow for the exchange of data in communication system 10. Segments 30, which may comprise any suitable wireless or wireline communication links, including one or more communication networks (e.g., WANs) as appropriate, couple various networks with each other and with endpoints 22 and IS 20. In particular embodiments, segments may include gateways for facilitating communication between various networks, such as an LMR gateway between radio network 24a and IP network 24e.

In some cases, users of endpoints of one of communication networks 24a-24e may communicate with endpoints of another of communication networks 24a-24e through IS 20. IS 20 may facilitate the communication between endpoints of different networks by itself rebroadcasting the communications of one network to another network or IS 20 may cause other components which it can control to rebroadcast the communication. A radio network, such as radio network 24a or 24d, may support communication among portable mobile station endpoints, such as LMRs, using any suitable communication methods or features, such as cellular and push-to-talk (PTT). Communication networks 24a-24e may comprise networks of particular groups or agencies (e.g., a municipality's police department network), whether operational with respect to a particular area or otherwise.

IS 20 enables, facilitates and/or provides for interoperable communication among communication endpoints and devices, such as LMRs, cellular phones, IP phones, PCs, PDAs, PSTN phones, video monitors, cameras and sensors of one or more communication networks (e.g., communication networks 24a-24e) using Internet Protocol. Such endpoints may comprise IP or non-IP-enabled endpoints. In particular embodiments, IS 20 may control gateways (for example, of segments 30) in order to map radio frequencies of particular mobile radio endpoints to IP addresses for communication to other types of radio endpoints or IP devices. For example, a particular gateway may be able to receive communications from various types of endpoints (e.g., on various types of communication networks) and may convert such communications for transmission to other types of endpoints. IS 20's control of the gateway may control the various endpoints and/or networks that receive particular communications, depending on system functionality and configuration as further discussed below. Such control may include the mapping of communications and endpoints to IP addresses for interoperable communication. In some embodiments, IS 20 may host audio conferences that bridge communications received from endpoints. As indicated above, communication system 10 (including IS 20) may include any suitable number or type of gateways (e.g., LMR and PSTN gateways), servers (e.g., multipoint conference servers), switches, routers, firewalls, access points, processors, memory or other hardware, software or encoded logic to provide functionality described herein. IS 20 is coupled to communication networks 24a-24d and endpoints 22 through IP network 24e, which may comprise any suitable IP network.

As indicated above, IS 20 uses IP to enable communication among endpoints of various networks. The endpoints of these various networks may not (without the aid of IS 20) normally be able to communicate with one another. The manner in which IS 20 facilitates communications among these endpoints may vary according to location and system or operational needs. For example, IS 20 may communicate with endpoints using multicast IP addresses assigned to an endpoint of a communication network, a group of endpoints of a communication network or one or more endpoints of multiple communication networks or alternatively using a peer to peer dialed connection or a nailed dialed connection. A group of endpoints may be combined into a VTG for communication using a particular IP address. As an example, the VTG may be assigned a multicast IP address through which users of various endpoints may communicate on the VTG. The use of multicast IP addresses allows IS 20 to facilitate communications among communication devices and endpoints of various communication networks to provide audio, data, video and control network interoperability. As an additional example, in some cases multicast streams (e.g., utilizing multicast IP addresses) may be used. In some cases nailed dialed connections, such as those using SIP protocol, may be used for communication among endpoints and with IS 20. Various embodiments may combine communication methods to facilitate communication among endpoints. For example, in some cases certain endpoints of a virtual talk group may participate in the talk group through a multicast IP address while other endpoints may utilize a nailed SIP connection. Unless otherwise noted, participating in a VTG may include being able to both transmit and receive communications. IS 20 may control participation, for example, by controlling gateways, multipoint conferences and the mapping of communications to IP addresses.

IS 20 may be utilized and implemented in any number of market segments, such as enterprise safety and security (e.g., loss prevention), transportation, retail, public safety and federal agencies in order to provide radio and non-radio network interoperability within and between such market segments. As indicated above, such network interoperability includes the interoperability of push-to-talk voice technology within various networks and the interoperability between push-to-talk and full duplex dialed connections.

It will be recognized by those of ordinary skill in the art that endpoints 22 and IS 20 may be any combination of hardware, software, and/or encoded logic that provides communication services to a user. In the illustrated embodiment, endpoints 22 comprise a PC (endpoint 22*a*), a personal data assistant (PDA) (endpoint 22*b*) and an IP phone (endpoint 22*c*). However, in other embodiments, endpoints 22 may include a telephone, a video monitor, a camera, a cell phone, a land mobile radio (LMR), a command center or any other communication hardware, software and/or encoded logic that supports the communication of audio, video or other data, using packets of media (or frames) or otherwise, through communication system 10. Endpoints 22 as well as endpoints and components of communication networks 24 may be capable of communicating using any particular type of technology, such as cellular, IP, PSTN, CDMA, GSM, TDMA and satellite. Endpoints 22 and IS 20 may also include unattended or automated systems, gateways, other intermediate components or other devices that can establish media sessions.

Although the illustrated embodiment includes five communication networks 24*a*-24*e*, the term "communication network" should be interpreted as generally defining any network capable of transmitting audio and/or video telecommunication signals, data, and/or messages, including signals, data or messages. Any one of networks 24*a*-24*e* may be implemented as a local area network (LAN), wide area network (WAN), cellular network, global distributed network such as the Internet, Intranet, Extranet, PSTN, LMR network, radio network (RN), CDMA network, GSM network, TDMA network, satellite network or any other form of wireless or wireline communication network.

Communications over communication networks 24*a*-24*e* may use any suitable communication protocol. In a particular embodiment, some communication networks may employ voice communication protocols that allow for the addressing or identification of endpoints, nodes, and/or other components coupled to the communication network. For example, using Internet protocol (IP), each of the components coupled together by, for example, communication network 24*b* in communication system 10 may be identified in information directed using IP addresses. In this manner, network 24*b* may support any form and/or combination of point-to-point, multicast, unicast, or other techniques for exchanging media packets among components in communication system 10. Any network components capable of exchanging audio, video, or other data are included within the scope of the present invention.

Since IP networks share a common method of transmitting data, telecommunication signals may be transmitted between telephony devices located on different, but interconnected, IP networks. In addition to being coupled to other IP networks, communication network 24*b* may also be coupled to non-IP telecommunication networks, for example through the use of interfaces or components, including gateways. In the illustrated embodiment, communication network 24*b* may be coupled with PSTN 24*c* through a gateway. In some embodiments the gateway may be a part of IS 20 or network 24*e*. PSTN 24*c* includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 24*c*), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, one or more of endpoints 22, and endpoints and components of communication networks 24 may be IP telephony devices capable of participating in IM, video, and other multimedia communication sessions. IP telephony devices have the ability of encapsulating a user's voice (or other input) into IP packets so that the voice can be transmitted over a communication network. IP telephony devices may include telephones, fax machines, computers running telephony software, nodes, gateways, wired or wireless devices, hand held PDAs, or any other device capable of performing telephony functions over an IP network.

In particular embodiments, communication system 10 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

Although FIG. 1 illustrates a particular number and configuration of endpoints, IS and communication networks, communication system 10 contemplates any number or arrangement of such components for communicating media.

Figure 2:
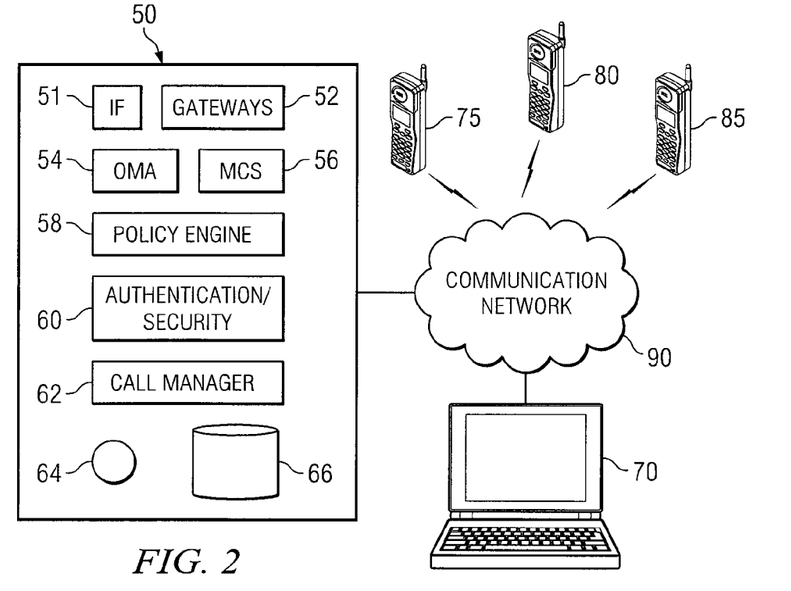
FIG. 2 illustrates an example interoperability system, in accordance with a particular embodiment.

FIG. 2 illustrates interoperability system (IS) 50, in accordance with a particular embodiment. IS 50 may be similar to and provide similar functionality as IS 20 of FIG. 1. In the illustrated embodiment, IS 50 includes interface 51, gateways 52, operations management application (OMA) 54, multipoint conference system (MCS) 56, policy engine 58, authentication and security system 60, call manager 62, processor 64 and memory module 66. IS 50 is coupled to PC endpoint 70 and LMR endpoints 75, 80, and 85 via communication network 90. Communication network 90 may include one or more of communication networks 24 depicted in FIG. 1. PC endpoint 70 may be used to access, configure and control various functionality provided by IS 50. PC endpoint 70 may run a client application for such access, configuration and control. The client application may enable a user of endpoint 70 to receive and monitor communications from various endpoints and virtual talk groups. In particular embodiments, other types of endpoints may be utilized to access, configure and control IS 50, such as IP phones, web based thin clients, PDAs and mobile devices. IS 50 may be coupled to such endpoints (including PC endpoint 70) through one or more communication networks.

Interface 51 is used in the communication of audio, video, signaling and other data between IS 50 and other network components. For example, interface 51 may receive communications from endpoints such as endpoints of communication networks 90, endpoints 75, 80 and 85. The communication may take place, in whole or in part, over IP networks thereby negating the need for dedicated wiring between the endpoints and the IS.

Gateways 52 may include any suitable gateways to provide network interoperability and back-end legacy application integration, such as LMR gateways, PSTN gateways and application gateways. Gateways 52 provide mapping between IP services and the interoperable networks, such as LMR network 24a of FIG. 1. In some cases gateways 52 may not be located within an IS but may be distributed throughout a communication system for enabling communications among various communication networks.

Operations management application (OMA) 54 includes functionality for configuration, management and control of IS 50, including conference and collaboration management, and may be accessed by a user via, for example, PC endpoint 70. In particular embodiments, OMA 54 may enable a user, such as dispatch personnel or administrators or a mobile user (e.g., a first responder mobile user) accessing IS 50 via a mobile endpoint, to configure, manage and participate in one or more virtual talk groups and ad hoc conferences simultaneously. In particular embodiments, OMA 54 may be accessed through a web interface, functioning for example as a soft phone for radios. A screen display may be controlled using a mouse, keypad, touch screen, voice commands or any other suitable interface. OMA 54 screen displays may include any number of functional controls to provide interoperable communications. OMA 54 may authenticate a user and obtain user configuration information upon a user accessing the OMA. OMA 54 may monitor and provide communication ability for any number of channels and modalities at one time to provide the ability for an OMA user to communicate on and control multiple virtual talk groups at once. In particular embodiments, OMA 54 may manage and control recording and oversee the playback of recorded communications in particular VTGs.

Multipoint conference system (MCS) 56 provides collaboration and conference services for multiple endpoints of one or more networks. For example, users of multiple endpoints (such as LMRs of different networks (e.g., networks of different agencies or groups) and different types of endpoints of different networks) may be bridged together through MCS 56 to provide virtual talk group communications. MCS 56 may include any suitable number or type of conference bridges, ports, digital signal processors or other components to facilitate communications discussed herein.

Policy engine 58 includes policies for undertaking various operations and functionality upon the occurrence of various events to provide dynamic incident management. These policies may include both pre-determined and ad hoc policies. For example, upon detecting a new endpoint within a VTG, a predetermined policy may be executed to seamlessly update that endpoint with the status of the VTG. During the update process, the endpoint may, on an ad hoc basis, adjust the way in which the update is presented. The adjustments may be, for example, to any of the following: the speed at which the recorded communications are played back (e.g., speed up or slow down the playback), the type of communications that are played back (e.g., from certain endpoints or from certain communication networks), when the communications are presented (e.g., before or after the endpoint is able to participate in the VTG or only when there is silence in the VTG's communications), how communications are presented (e.g., pitch or tone, audible or text, background or foreground) or any other aspect that may be desirable to change (e.g., how far back the playback begins). Similarly, policy engine 58 may include policies for determining when the communications of a VTG should be recorded, such as any of the policies discussed below. Policy engine 58 may determine which particular endpoints are to be updated and what capabilities they may have (e.g., audio only, audio and visual, visual only) for receiving the update.

Authentication and security system 60 manages access, configuration and control privileges for users of IS 50 and those participating in interoperable communications. For example, different users may have different privileges assigned for interoperable communications. Some users may only have transmit or listen privileges with respect to one or more particular talk groups, while other users may have the ability to communicate in all talk groups or setup and configure various talk groups. User privileges may change dynamically upon the occurrence of particular events.

Call manager 62 maintains information regarding various users, such as users of IP networks for which interoperable communications are provided by IS 50. This facilitates in the extension of PTT to IP networks and in the provision of voice and data interoperability across radio and non-radio networks. In particular embodiments, call manager 62 may maintain a listing, table, or other organization of information about users. The information may include a name or other identifier and contact information such as phone numbers and email addresses for the users. In some embodiments, the information about users is maintained within other components coupled to call manager 62 through, for example, network 90 so that call manager 62 may use the network to access the information about users. In particular embodiments call manager 62 may represent any appropriate combination of hardware, software and/or encoded logic distributed throughout a communication network coupled with an IS.

Processor 64 may be a microprocessor, controller, or any other suitable computing device, resource, or combination of hardware, software and/or encoded logic operable to provide, either alone or in conjunction with other IS components such as OMA 54, IS 50 functionality. Such functionality may include providing various features discussed herein to a user, such as a user of an endpoint accessing IS 50 through OMA 54. Such features may include controlling how and when the communications of a particular VTG are recorded and how and when to playback the communications to update endpoints added to the VTG.

Memory module 66 may be any form of volatile or non-volatile memory including, without limitation, magnetic media, optical media, random access memory (RAM), read-only memory (ROM), removable media, or any other suitable local or remote memory component. Memory module 66 may store any suitable data or information, including software and encoded logic, utilized by IS 50. In some embodiments memory module 66 may store recorded communications and/or playback options or settings (e.g., for an individual, a group or a VTG). In particular embodiments, memory module 66 may include data for user management, talk-group management, resource pool management, privileges, backup configuration and information and/or timestamp and activity tracking.

IS 50 may also include any number of switches, routers, firewalls, mobile access routers, access points, wireless bridges and other components in order to accommodate particular operational desires and needs.

In particular embodiments such as in the LMR network interoperability context, IS 50 may, through one or more components discussed above or through other components, encode received audio with a standard audio codec, such as G.711 or G.729. Those audio samples may be packaged in standards-based real-time transport protocol (RTP) or real-time transport control protocol (RTCP) packets suitable for transport on an IP network. At this point, the communication element may be abstracted from the distinctive characteristics of each radio system. These audio packets can be sent across the network to other radio systems either individually (unicast) or as a group (multicast). The recipient of the audio packets may be a device capable of receiving and decoding the RTP or RTCP stream, such as an IP telephone or PC with appropriate software. The IP network and IP-enabled devices can be used to allow endpoints to monitor or transmit on a particular radio channel from a desk without issuing another radio.

As indicated above, IS 50 may facilitate communication among endpoints of various networks through virtual channels or talk groups. For example, a channel may comprise a unidirectional or bidirectional path for transmitting and/or receiving electrical or electromagnetic signals. This may comprise, for example, a conventional radio physical RF channel. A talk group in this context may be a subgroup of users who share a common functional responsibility and typically coordinate their actions amongst themselves without communicative interaction with other subgroups. For example, a building's security force network may include various endpoints that do not usually require radio connectivity with other functional groups but who are in constant communication amongst themselves, whether by radio, telephone or other forms of electronic communication.

A virtual talk group (VTG) represents interoperability of a group of channels, for example, as an audio conference or meeting. A virtual talk group may include an associated virtual channel and an ID. Virtual channels may comprise an address, such as an IP address, associated with a virtual talk group through which users may access the virtual talk group and/or through which communications from VTG member-endpoints are bridged. Various types of virtual talk groups may be utilized in particular embodiments, such as a multicast address usable by all endpoints of the VTG, a VTG comprising multiple talk groups (e.g., multiple radio sources from different frequencies whose communications are mixed), a unicast group and a combination unicast and multicast group.

As an example, a particular virtual talk group may comprise any one or more of the following: (1) a channel or other multicast path used by certain users of a police department's radio network, (2) a channel or other multicast path used by certain users of a fire department's radio network, (3) a channel or other multicast path used by certain users of a corporation's security radio network and (4) a plurality of users of IP-enabled endpoints such as IP phones, IP-enabled PDAs or PCs. An operator of IS 50 may configure the virtual talk group using any suitable interface, such as by dragging and dropping the included channels and IP endpoints into a single area representing the virtual talk group. The VTG may also be configured by IS 50 through, for example, the use of OMA 54, policy engine 58, and processor 64, according to an organization's defined policies. During the life of this VTG the communications of the various endpoints within the VTG may be recorded. The recorded communications may then be played back for users of endpoints that join the VTG. The playback may be used to update or apprise the users of the endpoints of the situation of the VTG.

MCS 56 may provide the functionality for conferencing of the virtual talk group members. In particular embodiments, multiple talk groups may be patched together on a dynamic, as needed basis. In some cases a virtual talk group may not necessarily include communications through an IS but may instead include member endpoints whose communications are mapped to IP addresses at gateways (such as LMR gateways) controlled by an IS.

The following scenario is presented to help in understanding the functionality of particular embodiments. It should be noted that this scenario is for illustrative purposes only and depicts only some of the features and workings of a particular embodiment. It is not intended to illustrate all features of all embodiments.

For purposes of this scenario, assume that LMRs 75, 80 and 85 are all part of different communication networks. For example, assume that LMR 75 is part of a police department communication network (PDCN), that LMR 80 is part of a buildings security communication network (SCN) and that LMR 85 is part of a FBI communication network (FBICN). LMRs 75, 80 and 85 may not normally be in direct communication with each other. For simplicity, PO 75 may be used to refer to either a police officer or her LMR 75, SO 75 may be used to refer to either a security officer or his LMR 80, and FBI 85 may be used to refer to either a FBI agent or his LMR 85.

Assume that there has been a bomb threat in a building in which SO 80 is currently on-duty. Upon receiving notice of the bomb threat, a dispatcher from the local police department may create a virtual talk group to facilitate communications among those endpoints that are dealing with the bomb threat. For purposes of this scenario, the only other endpoint that was in the vicinity of the building and available to participate in the bomb threat VTG (besides SO 80) was PO 75. Thus, when the dispatcher creates the bomb threat VTG she may include PO 75, SO 80 and herself in the bomb threat VTG, thereby allowing PO 75 and SO 80 to communicate with one another as though they are part of the same communication network even though they are still using their original communication network (i.e., PDCN and SCN, respectively). Particular embodiments of the present invention may also include other types of endpoints within the bomb threat VTG (or any other VTG that may be created). For example, the bomb threat VTG may include PSTN telephones located inside the building, cell phones belonging to people interested in the bomb threat (e.g., the owner of the building, the police chief), other LMRs or any other endpoint that supports communication in some form.

Upon the dispatcher creating the bomb threat VTG, IS 50 may begin recording the communications being transmitted between endpoints PO 75 and SO 80 within the VTG. The communications may be received through IF 51 and stored within memory module 66. The recording of the VTG's communications may be triggered by any of several different events or factors depending on the policies being used by IS

50. For example, in some embodiments the mere creation of a VTG may cause the communications therein to be recorded. Particular embodiments may begin recording if a particular type of VTG (e.g., fire or bomb threat, VTGs of specific size, duration or location) is created. In some embodiments the recording may be triggered by the absence from the VTG of one or more particular endpoints. As mentioned above, particular embodiments may combine different criteria in determining when to record the VTG's communications. For example, some embodiments may begin recording if the fire chief is not present in a VTG formed in response to a fire in a residential area. In particular embodiments a dispatcher may need to enable the recording.

The length of recording that is stored, for example within memory module 66, may depend on the configuration of IS 50. In some embodiments IS 50 may store the communications transmitted during the life of the VTG (i.e., from the formation to the termination of the VTG). In particular embodiments, IS 50 may store those communications transmitted or received within a certain amount of time (e.g., the last hour). In particular embodiments IS 50 may use the same storage scheme (e.g., store communications for the life of the VTG or for a certain amount of time) for every VTG, while in others an IS may use different recording lengths for different VTGs. Within those embodiments that may use different recording lengths for different VTGs, some embodiments may allow the dispatcher to set the length of recording, and some may associate such length with the type of VTG. Furthermore, some embodiments may utilize a simplified recording in which IS 50 may continuously record everything within a VTG (including the communications, silence, and/or noise), while particular embodiments may use a form of smart recording, for example recording only when there is a communication. Where IS 50 only records when there is a communication, memory module 66 may store each communication as a separate discrete communication or it may store them as a single large communication. Furthermore, in some embodiments in which IS 50 only records when there is a communication, memory module 66 may store information relating to the timing of the communications (e.g., the time or location and duration of the silence between communications). This information may be used in re-creating the timing of the communications of the VTG so that it may more accurately reflect the original VTG communications. This may allow an endpoint to playback the communications with or without the silences.

Some time after the bomb threat VTG is formed and IS 50 begins recording the communications therein, FBI 85 may be added to the bomb threat VTG. He may be added by himself, the dispatcher, some other endpoint, or IS 50 (including any components coupled thereto). IS 50 may add him for a variety of reasons, for example based on his location or his function (e.g., he is the FBI bomb threat expert). Upon being added to the bomb threat VTG, FBI 85 may need to be apprised of the situation because he was not previously a part of the bomb threat VTG and may not be aware of the situation within the VTG. Furthermore, it may not be desirable for one of the other endpoints of the bomb threat VTG, who may be knowledgeable of the situation, to provide FBI 85 with an update. For example, the other endpoints may not have the time, ability or capability of updating FBI 85; they may not want to tie-up the communication channels of several endpoints to update a single endpoint; or the VTG may be adding/removing endpoints at a relatively high rate such that it may not be efficient and/or practical to use knowledgeable endpoints to update the new endpoints. However, while it may not be desirable to have one of the knowledgeable endpoints within the VTG update FBI 85, it may still be desirable for FBI 85 to be updated.

To update FBI 85 IS 50 may, through some combination of OMA 54, policy engine 58, processor 64, memory 66 and interface 51, play back the communications stored within memory module 66. How the communications are played back may depend on several factors such as how IS 50 and/or policy engine 58 have been configured and/or the input from FBI 85 and/or the dispatcher.

In particular embodiments FBI 85 may receive the recorded communications before he is able to participate in the VTG. In most situations this may not be desirable because it may delay FBI 85's participation in the VTG. However, where IS 50 plays back a certain number of discrete communications and/or increases the playback speed (both of which are discussed in more detail below), the amount of time lost by FBI 85 while he waits for the update to finish may not be significant.

In some embodiments, FBI 85 may be updated while he participates in the VTG. This may be facilitated in some embodiments by the use of a whisper feature in playing back the recorded communications. The whisper playback may allow FBI 85 to participate in the bomb threat VTG while he is being updated. The whisper feature plays the recorded communications at a lower volume than live communications so that FBI 85 may hear the live communications over the recorded communications.

In some embodiments IS 50 may allow FBI 85 to control the playback of the recorded communications. Thus, FBI 85 may be able to rewind back to a communication that he missed (e.g., where a live communication drowns out a recorded communication being presented using the whisper feature) or that was particularly important and he wants to make sure he heard it all. Similarly, FBI 85 may fast forward through parts that are not particularly relevant or interesting or which convey information of which he may already be aware. The playback control may also allow him to pause the playback, for instance, when he needs to give a particular task his undivided attention or when he wants to be able to listen to VTG communications without being distracted by recorded communications. The control of the playback of the recorded communications may be used whether or not a whisper feature is used.

In particular embodiments, IS 50 may temporarily stop or pause playback when live communications are detected. This has the effect of only playing back the recorded communications when there may not be any VTG communications. Depending on the particular embodiment and the current arrangement of VTGs, it may be that IS 50 stops playing back the recorded communications when there is silence within the particular VTG that is the source of the recorded communications, or when there is silence within all the VTGs of which the endpoint is a member (e.g., a dispatcher may be part of several VTGs and so it may be desirable to have playback only occur when there is silence throughout all the VTGs). Within those embodiments that temporarily stop or pause the playback of the recorded communications, some may resume playback from the spot where it stopped, and some may resume playback from a previous spot a certain amount of time before the spot where it last stopped or paused the playback. In particular embodiments, IS 50 may associate a priority with each communication. The priority may be based on the endpoint that created the communication or the VTG from which the communication originated. When the recorded communications are being played back for FBI 85, IS 50 may pause the playback if it detects a communication, from any endpoint having a higher priority than the recorded communication. The higher priority communication may come from any endpoint with which FBI 85 is in contact (e.g., endpoints from the bomb threat VTG, any other VTGs of which FBI 85 is a member, or endpoints using the FBICN). Thus, only higher priority endpoints may interrupt the update process.

Presenting FBI 85 with both the recorded communications and the bomb threat VTG's communications may cause him confusion in determining which are VTG communications and which are recorded communications. Different embodiments may use different techniques to differentiate between VTG and recorded communications. For example, some embodiments may change the way the recorded communications sound by altering such aspects as the pitch or tone of the recorded communications. Some embodiments of IS 50 may include a unique identifier that helps FBI 85 differentiate between live and recorded communications. For example, some embodiments may use a visual identifier, such as a light located on the endpoint or a particular color or image for the background for endpoints that have a graphical display. Particular embodiments may use an audible signal, such as a tone in the background, or beeps before and/or after presenting recorded communications to signify which communications are recorded and which are live.

There are at least two different points at which policy engine 58 may be done updating FBI 85 with recorded communications. The first possible stopping point may be the point at which FBI 85 joined the VTG. This may be useful where FBI 85 was able to hear both the live communications and the recorded communications. Thus, there would not be a need to present the recorded communications that he may already have received once he joined the VTG. Another possible stopping point may be the point at which FBI 85 has heard all the recorded communications up to the present. This may be useful where FBI 85 was not able to hear VTG communications until he was finished being updated.

The VTG communications may be recorded for reasons other than to be played back to update particular endpoints added to particular VTGs. For example, VTG communications may be recorded to maintain a record of what took place within a VTG during a particular event. In particular embodiments, FBI 85 may want to get guidance from another endpoint who is not a member of the bomb threat VTG. To do so FBI 85 may communicate a request to IS 50 to have IS 50 play the recorded communications from the bomb threat VTG for the other endpoint. In some embodiments, IS 50, through for example policy engine 58, may keep track of the privileges required to listen to particular recorded communications. Then, prior to playing a recorded communication, IS 50 may check, via policy engine 58 and memory module 66, the privileges stored for the endpoint and allow the playback of the recorded communication if the stored privileges of the endpoint match with the policy's privilege requirements. If they match IS 50 may then allow the endpoint to listen to the recorded communications from the bomb threat VTG as though he were a member of the VTG.

Thus far several different embodiments and features have been presented. Particular embodiments may combine one or more of these features depending on operational needs and/or component limitations. This allows for great adaptability of IS 50 to the needs of various organizations and users. For example, a particular embodiment may record the communications of a VTG using smart recording that only records when VTG communications are being transmitted. The recording may be triggered by a VTG created for a bank robbery in which the chief of police is not presently available. Then, once the police chief becomes available the communications may be presented to him using a whisper feature when there is silence among all the VTGs to which the police chief is a member.

Any number of virtual talk groups may be configured to provide any suitable audio, data, video and control network interoperability. Virtual talk groups may be created using any suitable user/endpoint groups or channels based on location, organizational requirements, event requirements or any other suitable characteristic. An administrator or operator may configure channel details such as name, description, participants, multicast IP addresses, codec and latch options through, for example, OMA 54.

Figure 3:
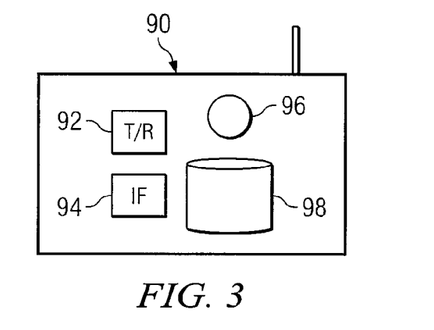
FIG. 3 illustrates an example endpoint, in accordance with a particular embodiment.

FIG. 3 illustrates an endpoint 90, which may comprise a mobile endpoint, in accordance with a particular embodiment. Endpoint 90 may be similar to, and may provide functionality similar to, other endpoints discussed herein, such as LMRs, cellular phones, IP phones, PCs, PDAs, PSTN phones, video monitors, cameras or sensors.

In the illustrated embodiment, endpoint 90 includes a transmitter/receiver 92, a user interface 94, a processor 96 and a memory module 98. Transmitter/receiver 92 receives and transmits communications such as audio, video and other data to and from other network components and also may receive and transmit location information. User interface 94 provides a mechanism through which a user of endpoint 90 may operate the endpoint and communicate with other network devices. Interface 94 may comprise a keypad, display, touch screen, audio input or any other suitable interface. Instructions may be submitted through speech recognition, collection of keystrokes, soft key or otherwise. Such instructions may include, for example, an override command sent from endpoint 90 to prevent it from being assigned to a particular VTG or instructions/requests to control the playback of the recorded communications.

Processor 96 may be a microprocessor, controller, or any other suitable computing device, resource, or combination of hardware, software and/or encoded logic operable to perform endpoint functionality. Processor 96, either alone or in conjunction with other endpoint components, provides endpoint functionality discussed herein. Memory module 98 may be any form of volatile or non-volatile memory including, without limitation, magnetic media, random access memory (RAM), read-only memory (ROM), removable media, or any other suitable local or remote memory component.

In particular embodiments, endpoint 90 may be used by a command officer or other user and may run a client application of IS 50. In some cases endpoint 90 may receive communications from a plurality of endpoints, and processor 96 may filter out certain communications for presentation to a user of endpoint 90 based on the VTG of the transmitting endpoint or any other criteria the command officer may choose.

It will be recognized by those of ordinary skill in the art that endpoints and interoperability systems disclosed herein are merely example configurations in accordance with particular embodiments. These systems may include any number of interfaces, processors, memory modules, or other components to accomplish the functionality and features described herein. In addition, these components and other desired components for performing the above described functionality may be centrally located (local) with respect to one another, or distributed throughout communication systems and networks. In addition, one or more components of these systems and devices may work together in performing various functionality described herein.

Figure 4:
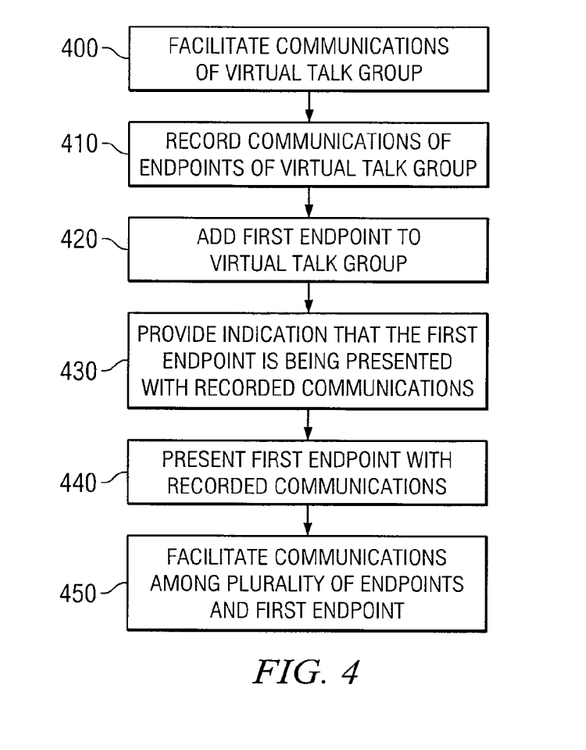
FIG. 4 illustrates a method for joining a virtual talk group, in accordance with a particular embodiment.

FIG. 4 illustrates a method for joining a virtual talk group. The method begins at step 400 where communications of endpoints of a virtual talk group are facilitated. The specific composition of the various endpoints of the VTG may vary, as may the type of device which they are using to communicate with. For example, one VTG may include endpoints from different law enforcement agencies (e.g., highway patrol, sheriff, FBI, CIA, etc.) using LMRs and another VTG may include some endpoints that are using LMRs and some endpoints that are using cell phones. Regardless of the device or communication channel that is being used, the endpoints within the VTG may be able to communicate with one another through an IS. A particular VTG may be created in response to an event (e.g., a fire or a robbery) or as part of an organization's normal operating procedures (e.g., a building may have a VTG that includes the phones in the building and the security officers' LMRs).

When particular VTGs are created, it may be advantageous to record the communications of the endpoints therein. This may be useful where the communications will be replayed/analyzed later, where endpoints may be joining the VTG and want to be updated as to what has already been communicated, or where endpoints want advice from another endpoint and wants to provide that other endpoint with information about what has gone on within the VTG. Thus, at step 410, the communications of the VTG are recorded. In particular embodiments the recording may begin at different times depending on the policies being used by the IS. For example, it may automatically begin once the VTG has been created, it may begin if a certain type of VTG is created (e.g., a VTG created in response to a specific event, such as a high-speed chase), it may begin if the endpoint that created the VTG indicates that the communications should be recorded, or it may begin if a particular endpoint is not within a particular VTG. Some embodiments may combine multiple criteria for determining when to begin to record communications. Furthermore, within particular embodiments the recording may not begin at the same time every time. Thus, some embodiments may allow recording to begin if a certain VTG is created during a certain time but may not begin recording if the same VTG is created at a different time. For example, if a particular endpoint is not part of a particular type of VTG, but that endpoint is on duty, the IS may begin to record the communications. If that endpoint is off duty then the IS may not record the communications because there is a much smaller chance that the off duty endpoint will even be able to join the VTG to be updated.

Similarly, different embodiments may store different lengths of recorded communications. For example, some embodiments may store those communications transmitted or received during the life of a VTG. Particular embodiments may store those communications transmitted or received within a certain amount of time (e.g., those communications transmitted within the last hour). Furthermore, some embodiments may utilize plain recording in which the IS records regardless of whether communications are being transmitted. Particular embodiments may use smart recording in which the IS records when communications are being transmitted within the VTG. In some embodiments, the IS may not record when there is silence within the VTG, but it may keep a record of the timing and the duration of the silence. This information may be used at a later time to obtain real-time forensic information required to analyze the operation.

As indicated above, during the life of a particular VTG endpoints may be added. These endpoints may not be fully aware of what is going on within the VTG and may thus need to be updated. After adding a first endpoint to the VTG, at step 420, the first endpoint may be presented with the recorded communications of the endpoints within the VTG at step 440. In some embodiments, as or before the first endpoint is presented with the recorded communications he is alerted that the communications he is receiving are recorded communications. This is shown at step 430. Once the first endpoint has been added to the VTG (and in particular embodiments, been updated) he is able to communicate with the other endpoints within the VTG as though they were all using the same communication network.

Depending on the embodiment, configuration, and user choices, both the indication and the presentation of the recorded messages can vary greatly. For example, the indication received at step 430 may be any of the following: illuminating a light on the endpoint (solid or flashing), changing the color of a light on the endpoint, changing the background of a graphical display, displaying a message or icon on a graphical display, providing a background tone, generating one or more beeps, changing the sound of the recorded communications, or any other means of alerting the first endpoint that the communications that are currently being presented are recorded communications. Similarly, in some embodiments, the first endpoint may display an indication when the VTG's communications are being presented. Thus, the user of the first endpoint is able to distinguish between the VTG's communications and the recorded communications.

As mentioned above, the presentation of the recorded communications can be quite varied. For example, the recorded communications presented at step 440 may be presented in any of the following ways: by presenting, in part or in whole, the recorded communications before the first endpoint is able to transmit or receive communications; by presenting the recorded communications at an accelerated rate so that, for example, a half-hour of recorded communications can be presented in twenty minutes; by presenting the recorded communications only when there is a break in the communications of the VTG; presenting the recorded communications if there is not a higher priority endpoint communicating within the VTG; by allowing the user to control the presentation of the recorded communications (e.g., pause, rewind or fast-forward the recorded communications); by allowing the first user to increase or decrease the rate at which the recorded communications are presented; by using a whisper feature in which the recorded communications are played in the background as the VTG's communications are presented in the foreground; and/or by any other method that may be desirable.

At step 450, either while the first endpoint is being presented with recorded communications or after the first endpoint has been presented with the recorded communications, the communications of the first endpoint and the plurality of endpoints within the VTG are facilitated. This allows the first endpoint to communicate with the other endpoints of the VTG as though they were using the same communication channel.

Some of the steps illustrated in FIG. 4 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10 and illustrated endpoints and interoperability systems, these elements may be combined, rearranged or positioned in order to accommodate particular routing architectures or needs. In addition, any of these elements may be provided as separate external components to communication system 10 and illustrated endpoints and interoperability systems, or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for joining an endpoint to a virtual talk group, comprising:
    facilitating communications of a virtual talk group, the virtual talk group comprising a plurality of endpoints of different communication networks;
    recording the communications of the plurality of endpoints of the virtual talk group;
    adding a first endpoint to the virtual talk group; detecting a condition in communications among the plurality of endpoints and the added first endpoint; presenting an option in response to the condition to the first added endpoint to play the recorded communications; presenting the first endpoint with the recorded communications of the plurality of endpoints of the virtual talk group;
    providing an indication to the first endpoint indicating that the first endpoint is being presented with the recorded communications of the virtual talk group such that the first endpoint may distinguish the recorded communications from the communications of the plurality of endpoints of the virtual talk group.

2. The method of claim 1, wherein facilitating communications among the plurality of endpoints of the virtual talk group and the added first endpoint while presenting the first endpoint with the recorded communications comprises presenting the first endpoint with the recorded communications when there is a pause in the communications of the plurality of endpoints of the virtual talk group.

3. The method of claim 1, wherein facilitating communications among the plurality of endpoints of the virtual talk group and the added first endpoint while presenting the first endpoint with the recorded communications comprises pausing the presentation of the recorded communications to the first endpoint upon detecting an endpoint communication.

4. The method of claim 3, wherein pausing the presentation of the recorded communications to the first endpoint upon detecting an endpoint communication comprises pausing the presentation of the recorded communications to the first endpoint upon detecting an endpoint communication having a priority greater than the recorded communication.

5. The method of claim 1, further comprising receiving a request from the first endpoint to change a manner by which the recorded communications are presented.

6. The method of claim 1, further comprising receiving a request from the first endpoint to control a manner of the presentation of the recorded communications.

7. The method of claim 1, wherein presenting the first endpoint with the recorded communications comprises increasing a rate by which the recorded communications are presented.

8. The method of claim 1, further comprising:
    determining that a condition of a predetermined policy has been satisfied; and
    recording the communications of the plurality of endpoints of the virtual talk group based on the satisfaction of the condition of the predetermined policy.

9. The method of claim 8, wherein determining that a condition of a predetermined policy has been satisfied comprises detecting an absence of the first endpoint from the virtual talk group.

10. A system for joining an endpoint to a virtual talk group, comprising:
    a processor operable to:
        facilitate communications of a virtual talk group, the virtual talk group comprising a plurality of endpoints of different communication networks;
        record the communications of the plurality of endpoints of the virtual talk group; and
        add a first endpoint to the virtual talk group;
    an interface coupled to the processor and operable to: detect a condition in communications among the plurality of endpoints and the added first endpoint; present an option in response to the condition to the first added endpoint to play the recorded communications; present the first endpoint with the recorded communications of the plurality of endpoints of the virtual talk group; and provide an indication to the first endpoint indicating that the first endpoint is being presented with the recorded communications of the virtual talk group such that the first endpoint may distinguish the recorded communications from the communications of the plurality of endpoints of the virtual talk group.

11. The system of claim 10, wherein the processor operable to facilitate communications among the plurality of endpoints of the virtual talk group and the added first endpoint while presenting the first endpoint with the recorded communications comprises a processor operable to present the first endpoint with the recorded communications when there is a pause in the communications of the plurality of endpoints of the virtual talk group.

12. The system of claim 10, wherein the processor operable to facilitate communications among the plurality of endpoints of the virtual talk group and the added first endpoint while presenting the first endpoint with the recorded communications comprises a processor operable to pause the presentation of the recorded communications to the first endpoint upon detecting an endpoint communication.

13. The system of claim 12, wherein the processor operable to pause the presentation of the recorded communications to the first endpoint upon detecting an endpoint communication comprises a processor operable to pause the presentation of the recorded communications to the first endpoint upon detecting an endpoint communication having a priority greater than the recorded communication.

14. The system of claim 10, wherein the processor is further operable to receive a request from the first endpoint to change a manner by which the recorded communications are presented.

15. The system of claim 10, wherein the processor is further operable to receive a request from the first endpoint to control a manner of the presentation of the recorded communications.

16. The system of claim 10, wherein an interface operable to present the first endpoint with the recorded communications comprises an interface operable to increase a rate by which the recorded communications are presented.

17. The system of claim 10, wherein the processor is further operable to:
  determine that a condition of a predetermined policy has been satisfied; and
  record the communications of the plurality of endpoints of the virtual talk group based on the satisfaction of the condition of the predetermined policy.

18. The system of claim 17, wherein the processor operable to determine that a condition of a predetermined policy has been satisfied comprises a processor operable to detect an absence of the first endpoint from the virtual talk group.

19. Software embodied in a computer readable medium for joining a virtual talk group, the software, when executed by a processor, operable to:
  facilitate communications of a virtual talk group, the virtual talk group comprising a plurality of endpoints of different communication networks;
  record the communications of the plurality of endpoints of the virtual talk group;
  add a first endpoint to the virtual talk group; detect a condition in communications among the plurality of endpoints and the added first endpoint; present an option in response to the condition to the first added endpoint to play the recorded communications; present
  the first endpoint with the recorded communications of the plurality of endpoints of the virtual talk group;
  provide an indication to the first endpoint indicating that the first endpoint is being presented with the recorded communications of the virtual talk group such that the first endpoint may distinguish the recorded communications from the communications of the plurality of endpoints of the virtual talk group.

20. The medium of claim 19, wherein the software when executed operable to facilitate communications among the plurality of endpoints of the virtual talk group and the added first endpoint while presenting the first endpoint with the recorded communications comprises software when executed operable to present the first endpoint with the recorded communications when there is a pause in the communications of the plurality of endpoints of the virtual talk group.

21. The medium of claim 19, wherein the software when executed operable to facilitate communications among the plurality of endpoints of the virtual talk group and the added first endpoint while presenting the first endpoint with the recorded communications comprises software when executed operable to pause the presentation of the recorded communications to the first endpoint upon detecting an endpoint communication.

22. The medium of claim 21, wherein the software when executed operable to pause the presentation of the recorded communications to the first endpoint upon detecting an endpoint communication comprises software when executed-operable to pause the presentation of the recorded communications to the first endpoint upon detecting an endpoint communication having a priority greater than the recorded communication.

23. The medium of claim 19, wherein the software when executed is further operable to receive a request from the first endpoint to change a manner by which the recorded communications are presented.

24. The medium of claim 19, wherein the software when executed is further operable to receive a request from the first endpoint to control a manner of the presentation of the recorded communications.

25. The medium of claim 19, wherein the software when executed operable to present the first endpoint with the recorded communications comprises code operable to increase a rate by which the recorded communications are presented.

26. The medium of claim 19, wherein the software when executed is further operable to:
  determine that a condition of a predetermined policy has been satisfied; and
  record the communications of the plurality of endpoints of the virtual talk group based on the satisfaction of the condition of the predetermined policy.

27. The medium of claim 26, wherein the software when executed operable to determine that a condition of a predetermined policy has been satisfied comprises software when executed operable to detect an absence of the first endpoint from the virtual talk group.

28. A system for joining an endpoint to a virtual talk group, comprising:
  means for facilitating communications of a virtual talk group, the virtual talk group comprising a plurality of endpoints of different communication networks;
  means for recording the communications of the plurality of endpoints of the virtual talk group;
  means for adding a first endpoint to the virtual talk group; means for detecting a condition in communications among the plurality of endpoints and the added first endpoint; means for presenting an option in response to the condition to the first added endpoint to play the recorded communications; means
  for presenting the first endpoint with the recorded communications of the plurality of endpoints of the virtual talk group;
  means for providing an indication to the first endpoint indicating that the first endpoint is being presented with the recorded communications of the virtual talk group such that the first endpoint may distinguish the recorded communications from the communications of the plurality of endpoints of the virtual talk group.

29. A method for joining an endpoint to a virtual talk group, comprising:
  facilitating communications of a virtual talk group, the virtual talk group comprising a plurality of endpoints of different communication networks;
  recording the communications of the plurality of endpoints of the virtual talk group;
  adding a first endpoint to the virtual talk group; detecting a condition in communications among the plurality of endpoints and the added first endpoint; presenting an option in response to the condition to the first added endpoint to play the recorded communications; presenting
  the first endpoint with the recorded communications of the plurality of endpoints of the virtual talk group; and
  wherein facilitating communications among the plurality of endpoints of the virtual talk group and the added, first endpoint while presenting the first endpoint with the recorded communications comprises pausing the presentation of the recorded communications to the first endpoint upon detecting an endpoint communication from one of the endpoints of the virtual talk group other than the first endpoint.

* * * * *

UNITED STATES PATENT AND TRADEMARK OFFICE
CERTIFICATE OF CORRECTION

PATENT NO. : 7,639,634 B2 Page 1 of 1
APPLICATION NO. : 11/421994
DATED : December 29, 2009
INVENTOR(S) : Shaffer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 595 days.

Signed and Sealed this

Ninth Day of November, 2010

David J. Kappos
*Director of the United States Patent and Trademark Office*